(12) United States Patent
Dong (10) Patent No.: US 11,598,242 B2
(45) Date of Patent: Mar. 7, 2023

(54) ALL-TERRAIN VEHICLE AND EXHAUST ASSEMBLY FOR ALL-TERRAIN VEHICLE

(71) Applicant: SEGWAY TECHNOLOGY CO., LTD., Changzhou (CN)

(72) Inventor: Zhen Dong, Changzhou (CN)

(73) Assignee: Segway Technology Co., Ltd., Changzhou (CN)

( * ) Notice: Subject to any disclaimer, the term of this patent is extended or adjusted under 35 U.S.C. 154(b) by 0 days.

(21) Appl. No.: 17/581,394

(22) Filed: Jan. 21, 2022

(65) Prior Publication Data

US 2022/0235690 A1 Jul. 28, 2022

(30) Foreign Application Priority Data

Jan. 28, 2021 (CN) .......................... 202120243553.5

(51) Int. Cl.
*F01N 13/18* (2010.01)
*B60K 20/02* (2006.01)
*F02B 75/22* (2006.01)

(52) U.S. Cl.
CPC .......... *F01N 13/1811* (2013.01); *B60K 20/02* (2013.01); *F01N 13/1827* (2013.01); *F02B 75/22* (2013.01)

(58) Field of Classification Search
CPC . F01N 13/1811; F01N 13/1827; B60K 20/02; F02B 75/22
See application file for complete search history.

(56) References Cited

U.S. PATENT DOCUMENTS

| 6,719,084 | B2 | 4/2004 | Kuji et al. |
| 7,905,315 | B2 | 3/2011 | Arnold |
| 2002/0185323 | A1* | 12/2002 | Tsutsumi ............. F02M 35/116 180/219 |
| 2008/0110155 | A1* | 5/2008 | Harada ............... F01N 13/0097 181/227 |
| 2012/0160588 | A1* | 6/2012 | Takagi .................... F01N 13/08 180/291 |

FOREIGN PATENT DOCUMENTS

| CN | 1496882 | A | 5/2004 |
| CN | 104018926 | A | 9/2014 |
| CN | 105065102 | B | 10/2017 |
| CN | 207064050 | U | 3/2018 |
| CN | 208918660 | U | 5/2019 |

(Continued)

*Primary Examiner* — Syed O Hasan
(74) *Attorney, Agent, or Firm* — Timothy W. Menasco, Esq.; Harter Secrest & Emery LLP (57) ABSTRACT

The present disclosure relates to an all-terrain vehicle and an exhaust assembly for an all-terrain vehicle. The all-terrain vehicle includes: a frame, a V-type twin-cylinder engine and an exhaust assembly. The V-type twin-cylinder engine has a first exhaust port and a second exhaust port, and a cylinder corresponding to the first exhaust port is located in front of a cylinder corresponding to the second exhaust port. The V-type twin-cylinder engine is mounted on the frame. The exhaust pipe group has a first end coupled to the first exhaust port, a second end coupled to the second exhaust port, and a third end coupled to a pipe of the muffler. The exhaust pipe group is divided into at least two exhaust pipes, and adjacent exhaust pipes are flexibly coupled.

18 Claims, 4 Drawing Sheets

(56) References Cited

FOREIGN PATENT DOCUMENTS

| | | |
|---|---|---|
| CN | 210317454 U | 4/2020 |
| CN | 212690162 U | 3/2021 |
| JP | 2000199426 A | 7/2000 |
| JP | 4397784 B2 | 1/2010 |
| JP | 4457680 B2 | 4/2010 |
| JP | 4922589 B2 | 4/2012 |
| JP | 2017159788 A | 9/2017 |

* cited by examiner

ALL-TERRAIN VEHICLE AND EXHAUST ASSEMBLY FOR ALL-TERRAIN VEHICLE

CROSS-REFERENCE TO RELATED APPLICATION

This application claims priority to and benefits of Chinese Patent Application Serial No. 202120243553.5, filed with China National Intellectual Property Administration on Jan. 28, 2020, the entire content of which is incorporated herein by reference.

FIELD

The present disclosure relates to the field of vehicle technologies, and more particularly, to an all-terrain vehicle and an exhaust assembly for an all-terrain vehicle.

BACKGROUND

All-terrain vehicles, also known as all-terrain four-wheeled off-road motorcycles, are simple and utility and have good off-road performance.

SUMMARY

An all-terrain vehicle according to embodiments of the present disclosure includes: a frame, a V-type twin-cylinder engine, and an exhaust assembly. The V-type twin-cylinder engine has a first exhaust port and a second exhaust port, a cylinder corresponding to the first exhaust port is located in front of a cylinder corresponding to the second exhaust port, and the V-type twin-cylinder engine is mounted on the frame. The exhaust assembly includes an exhaust pipe group and a muffler. The muffler is mounted on the frame. The exhaust pipe group has a first end coupled to the first exhaust port, a second end coupled to the second exhaust port, and a third end coupled to a pipe of the muffler. The exhaust pipe group is divided into at least two exhaust pipes, and adjacent exhaust pipes are flexibly coupled. The exhaust pipe group comprises a first exhaust pipe and a second exhaust pipe, the second exhaust pipe has three ports, a first port of the first exhaust pipe is coupled to the first exhaust port, a second port of the first exhaust pipe is flexibly coupled to a first port of the second exhaust pipe, a second port of the second exhaust pipe is coupled to the second exhaust port, a third port of the second exhaust pipe is flexibly coupled to the pipe of the muffler.

An all-terrain vehicle according to embodiments of the present disclosure includes: a frame, a V-type twin-cylinder engine, and an exhaust assembly. The V-type twin-cylinder engine has a first exhaust port and a second exhaust port, a cylinder corresponding to the first exhaust port is located in front of a cylinder corresponding to the second exhaust port, and the V-type twin-cylinder engine is mounted on the frame. The exhaust assembly includes an exhaust pipe group and a muffler. The muffler is mounted on the frame. The exhaust pipe group has a first end coupled to the first exhaust port, a second end coupled to the second exhaust port, and a third end coupled to a pipe of the muffler. The exhaust pipe group is divided into at least two exhaust pipes, and adjacent exhaust pipes are flexibly coupled. In a projection of the all-terrain vehicle on a horizontal plane, a junction of the first exhaust pipe and the second exhaust pipe is located in an area between a front coupling position of the V-type twin-cylinder engine and the frame and a rear coupling position of the V-type twin-cylinder engine and the frame, and a junction of the second exhaust pipe and the muffler is located in an area between a rear wheel center of the all-terrain vehicle and the rear coupling position of the V-type twin-cylinder engine and the frame An exhaust assembly for an all-terrain vehicle according to embodiments of the present disclosure includes an exhaust pipe group and a muffler. The exhaust pipe group is coupled to the muffler. The exhaust pipe group is divided into at least two exhaust pipes, and adjacent exhaust pipes are flexibly coupled. The exhaust pipe group comprises a first exhaust pipe and a second exhaust pipe, the second exhaust pipe has three ports, a first port of the first exhaust pipe is configured to be coupled to a first exhaust port of a V-type twin-cylinder engine of the all-terrain vehicle, a second port of the first exhaust pipe is flexibly coupled to a first port of the second exhaust pipe, a second port of the second exhaust pipe is configured to be coupled to a second exhaust port of the V-type twin-cylinder engine of the all-terrain vehicle, a third port of the second exhaust pipe is flexibly coupled to a pipe of the muffler

REFERENCE NUMERALS 1, frame; 11, support; 12, pin shaft;

2, V-type twin-cylinder engine; 21, first exhaust port; 22, second exhaust port; 23, coupling lug;

3, exhaust pipe group; 31, first exhaust pipe; 32, second exhaust pipe; 33, first sealing sleeve; 34, second sealing sleeve;

4, muffler; 41, elastic sheet;

5, gearshift assembly; 51, shift rod; 52, shift handle.

DETAILED DESCRIPTION OF THE DISCLOSURE

Embodiments of the present disclosure will be described in detail and examples of the embodiments will be illustrated in the drawings. The embodiments described herein with reference to the accompanying drawings are explanatory, which are used to illustrate the present disclosure, but shall not be construed to limit the present disclosure.

For the all-terrain vehicles in the related art, an exhaust muffling system of an engine has complicated structure, is difficult to assemble, and is prone to gas leakage. Embodiments of the present disclosure provide an all-terrain vehicle, which has a simple exhaust muffling structure and is not easy to leak. Embodiments of the present disclosure further provide an exhaust assembly for an all-terrain vehicle.

The all-terrain vehicle according to embodiments of the present disclosure includes: a frame, a V-type twin-cylinder engine, and an exhaust assembly. The V-type twin-cylinder engine has a first exhaust port and a second exhaust port, a cylinder corresponding to the first exhaust port is located in front of a cylinder corresponding to the second exhaust port, and the V-type twin-cylinder engine is mounted on the frame. The exhaust assembly includes an exhaust pipe group and a muffler. The muffler is mounted on the frame. The exhaust pipe group has a first end coupled to the first exhaust port, a second end coupled to the second exhaust port, and a third end coupled to a pipe of the muffler. The exhaust pipe group is divided into at least two exhaust pipes, and adjacent exhaust pipes are flexibly coupled.

In the all-terrain vehicle according to embodiments of the present disclosure, the gas exhausted by the V-type twin-cylinder engine can be exhausted and muffled by the exhaust pipe group and the muffler; furthermore, due to flexible coupling between adjacent exhaust pipes of the exhaust pipe group, the pipe leakage caused by vibration of the all-terrain vehicle can be avoided; additionally, the exhaust muffling structure of the all-terrain vehicle according to embodiments of the present disclosure is simple and not easy to leak, and has high reliability.

In some embodiments, the exhaust pipe group is flexibly coupled to the muffler.

In some embodiments, the exhaust pipe group includes a first exhaust pipe and a second exhaust pipe, the second exhaust pipe has three ports; a first port of the first exhaust pipe is coupled to the first exhaust port, a second port of the first exhaust pipe is flexibly coupled to a first port of the second exhaust pipe, a second port of the second exhaust pipe is coupled to the second exhaust port, a third port of the second exhaust pipe is flexibly coupled to the pipe of the muffler.

In some embodiments, the second port of the first exhaust pipe is flexibly coupled to the first port of the second exhaust pipe through a first sealing sleeve, and the third port of the second exhaust pipe is flexibly coupled to the pipe of the muffler through a second sealing sleeve.

In some embodiments, the first sealing sleeve and the second sealing sleeve are spherical sealing sleeves or cylindrical sealing sleeves.

In some embodiments, the all-terrain vehicle further includes a gearshift assembly coupled to the V-type twin-cylinder engine, the gearshift assembly and the exhaust pipe group are respectively arranged at two sides of the V-type twin-cylinder engine in a width direction of the frame.

In some embodiments, the muffler is mounted on a rear portion of the frame, and an axial direction of the muffler is substantially parallel to a length direction of the frame or the axial direction of the muffler is substantially orthogonal to the length direction of the frame.

In some embodiments, in a projection of the all-terrain vehicle on a horizontal plane, a junction of the first exhaust pipe and the second exhaust pipe is located in an area between a front coupling position of the V-type twin-cylinder engine and the frame and a rear coupling position of the V-type twin-cylinder engine and the frame, and a junction of the second exhaust pipe and the muffler is located in an area between a rear wheel center of the all-terrain vehicle and the rear coupling position of the V-type twin-cylinder engine and the frame.

In some embodiments, the second exhaust pipe has a Y shape.

In some embodiments, an angle $\alpha$ between an axis of the cylinder corresponding to the first exhaust port and an axis of the cylinder corresponding to the second exhaust port satisfies: $60° \leq \alpha \leq 120°$.

In some embodiments, the angle $\alpha$ satisfies: $70° \leq \alpha \leq 95°$.

The exhaust assembly for an all-terrain vehicle according to embodiments of the present disclosure includes an exhaust pipe group and a muffler. The exhaust pipe group is coupled to the muffler. The exhaust pipe group is divided into at least two exhaust pipes, and adjacent exhaust pipes are flexibly coupled.

The exhaust assembly according to embodiments of the present disclosure has a simple structure, the gas exhausted by the V-type twin-cylinder engine can be exhausted and muffled by the exhaust pipe group and the muffler; furthermore, due to flexible coupling between adjacent exhaust pipes of the exhaust pipe group, the pipe leakage caused by vibration of the all-terrain vehicle can be avoided, improving reliability of the exhaust assembly in use.

An all-terrain vehicle and an exhaust assembly for an all-terrain vehicle according to embodiments of the present disclosure are described below with reference to the accompanying drawings.

As illustrated in FIGS. 1 to 4, an all-terrain vehicle according to embodiments of the present disclosure includes a frame 1, a V-type twin-cylinder engine 2 and an exhaust assembly. The exhaust assembly includes an exhaust pipe group 3 and a muffler 4. The V-type twin-cylinder engine 2 has a first exhaust port 21 and a second exhaust port 22. A cylinder corresponding to the first exhaust port 21 is located in front of a cylinder corresponding to the second exhaust port 22, and the V-type twin-cylinder engine 2 is mounted on the frame 1.

The muffler 4 is mounted on the frame 1, a first end of the exhaust pipe group 3 (e.g., a front end of the exhaust pipe group 3 in FIG. 2) is coupled to the first exhaust port 21, a second end of the exhaust pipe group 3 (e.g., a middle end of the exhaust pipe group 3 in FIG. 2) is coupled to the second exhaust port 22, and a third end of the exhaust pipe group 3 (e.g., a rear end of the exhaust pipe group 3 in FIG. 2) is coupled to a pipe of the muffler 4. The exhaust pipe group 3 is divided into at least two exhaust pipes, and adjacent exhaust pipes are flexibly coupled.

Adjacent exhaust pipes are flexibly coupled, which may be understood as the coupling between the adjacent exhaust pipes are in a sealed state, but relative displacement between adjacent pipe segments may occur without affecting sealing of the coupling between the adjacent exhaust pipes.

In the all-terrain vehicle according to embodiments of the present disclosure, the gas exhausted by the V-type twin-cylinder engine 2 can be exhausted and muffled by the exhaust pipe group 3 and the muffler 4; furthermore, due to flexible coupling between adjacent exhaust pipes of the exhaust pipe group 3, the pipe leakage caused by vibration of the all-terrain vehicle can be avoided; additionally, the exhaust muffling structure of the all-terrain vehicle according to embodiments of the present disclosure is simple and not easy to leak, and has high reliability.

In an embodiment, as illustrated in FIGS. 1 to 4, the exhaust pipe group 3 is flexibly coupled to the muffler 4, thus slight displacement between the exhaust pipe group 3 and the muffler 4 may also occur without affecting the sealing between the exhaust pipe group 3 and the muffler 4, further avoiding gas leakage of the exhaust assembly for the all-terrain vehicle.

In some embodiments, as illustrated in FIGS. 1 to 5, the exhaust pipe group 3 includes a first exhaust pipe 31 and a second exhaust pipe 32, and the second exhaust pipe 32 has three ports. It could be understood that, the second exhaust pipe 32 has a substantially Y shape. A first port of the first exhaust pipe 31 (e.g., a front port of the first exhaust pipe 31 in FIG. 5) is coupled to the first exhaust port 21, a second port of the first exhaust pipe 31 (e.g., a rear port of the first exhaust pipe 31 in FIG. 5) is flexibly coupled to a first port of the second exhaust pipe 32 (e.g., an upper front port of the second exhaust pipe 32 in FIG. 5), a second port of the second exhaust pipe 32 (e.g., a lower front port of the second exhaust pipe 32 in FIG. 5) is coupled to the second exhaust port 22, and a third port of the second exhaust pipe 32 (e.g., a rear port of the second exhaust pipe 32 in FIG. 5) is flexibly coupled to the pipe of the muffler 4.

In some embodiments, as illustrated in FIGS. 1 to 5, the second port of the first exhaust pipe 31 is flexibly coupled to the first port of the second exhaust pipe 32 through a first sealing sleeve 33, and the third port of the second exhaust pipe 32 is flexibly coupled to the pipe of the muffler 4 through a second sealing sleeve 34. For example, the first sealing sleeve 33 and the second sealing sleeve 34 are spherical sealing sleeves or cylindrical sealing sleeves. In at least one embodiment, the first sealing sleeve 33 is a spherical sealing sleeve or a cylindrical sealing sleeve, and the second sealing sleeve 34 is a spherical sealing sleeve. Thus, the all-terrain vehicle according to embodiments of the present disclosure can seal junctions of the exhaust assembly through the spherical sealing sleeve or the cylindrical sealing sleeve, to further improve sealing performance of the exhaust assembly.

Figure 2:
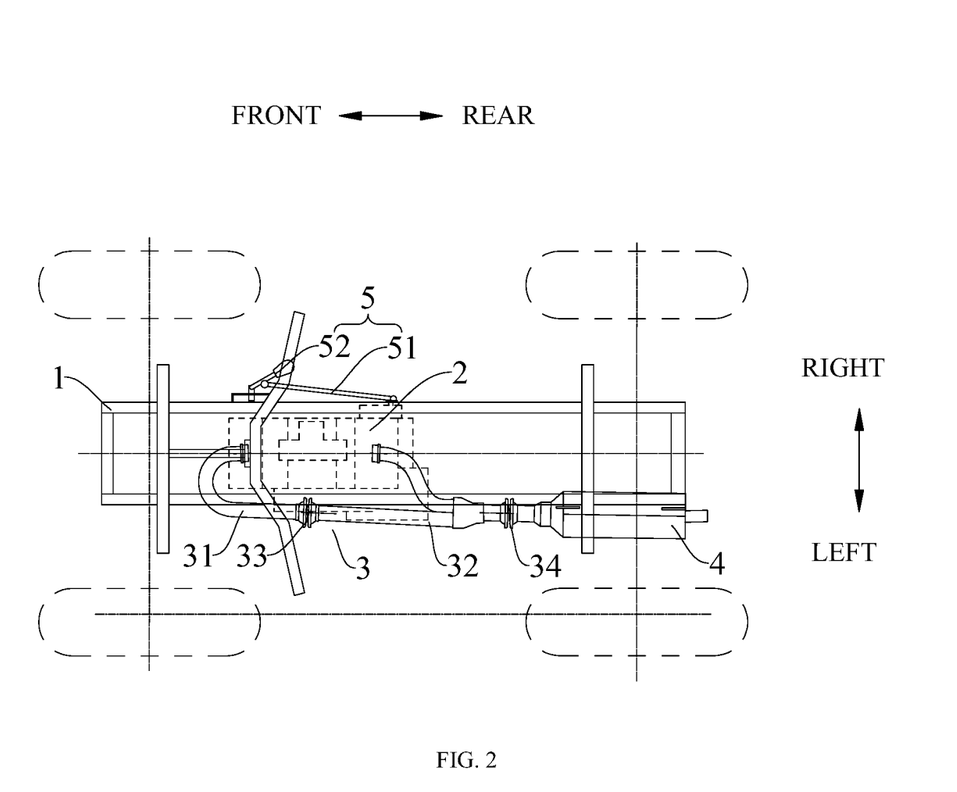
FIG. 2 is a top view of FIG. 1.

In some embodiments, as illustrated in FIG. 2, the all-terrain vehicle also includes a gearshift assembly 5. The gearshift assembly 5 includes a shift handle 52 and a shift rod 51. The shift handle 52 is coupled to the shift rod 51, and the shift rod 51 is coupled to the V-type twin-cylinder engine 2. The gearshift assembly 5 and the exhaust pipe group 3 are respectively arranged at two sides of the V-type twin-cylinder engine 2 in a width direction of the frame 1 (e.g., a left-right direction of the frame 1 in FIG. 2). In an embodiment, the exhaust assembly is located at a left side of the V-type twin-cylinder engine 2, and the gearshift assembly 5 is located at a right side of the V-type twin-cylinder engine 2. Thus, the exhaust assembly can be prevented from interfering with the gearshift assembly 5, further optimizing overall layout of the all-terrain vehicle.

Figure 1:
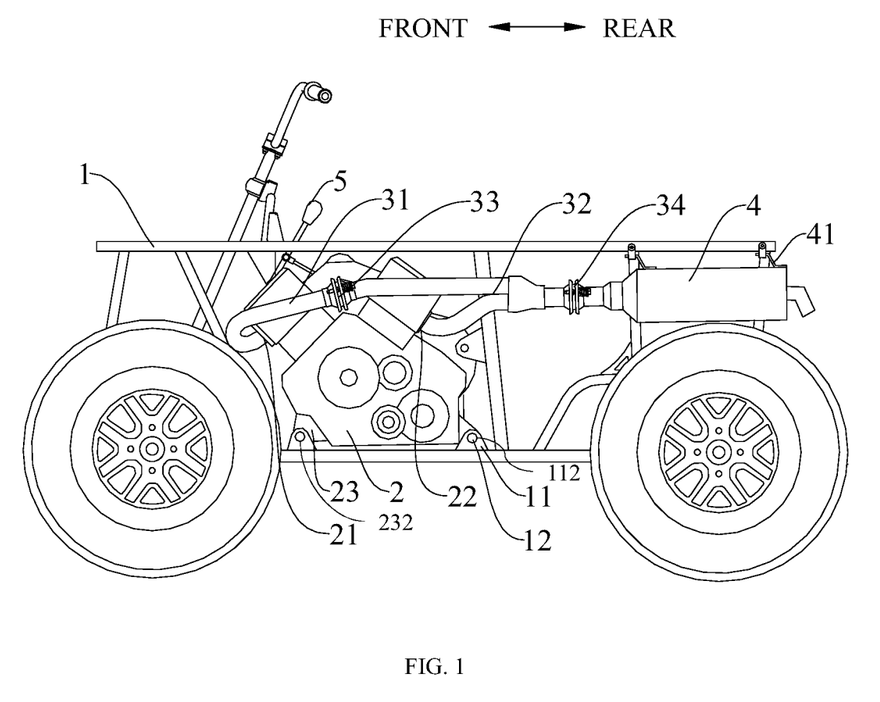
FIG. 1 is a schematic view of an all-terrain vehicle according to an embodiment of the present disclosure.
Figure 3:
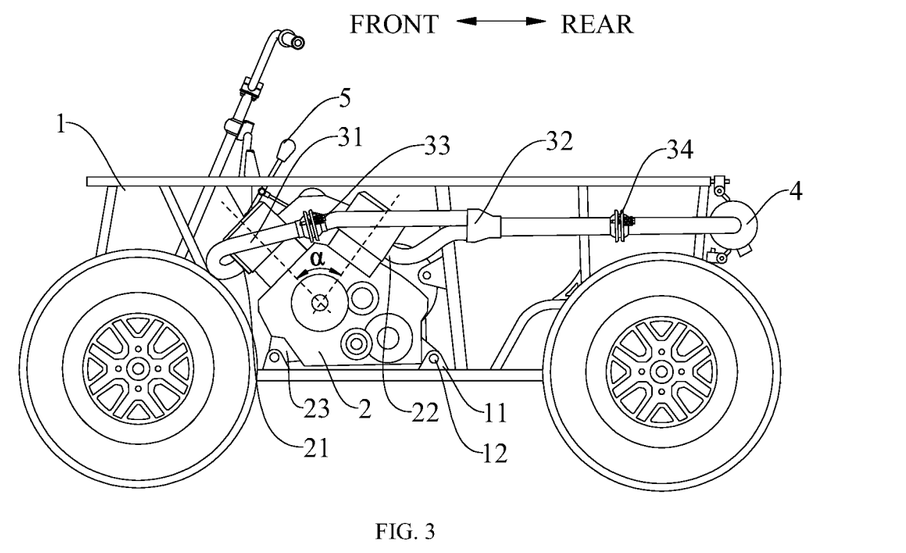
FIG. 3 is a schematic view of an all-terrain vehicle according to another embodiment of the present disclosure.

In an embodiment, as illustrated in FIG. 1, the muffler 4 is mounted on a rear portion of the frame 1, and an axial direction of the muffler 4 is substantially parallel to a length direction of the frame 1 (e.g., a front-rear direction in FIG. 2). Alternatively, as illustrated in FIG. 3, the axial direction of the muffler 4 is orthogonal to the length direction of the frame 1 (e.g., the front-rear direction in FIG. 2). In a projection of the all-terrain vehicle on horizontal plane, a junction of the first exhaust pipe 31 and the second exhaust pipe 32 is located in an area between a front coupling position of the V-type twin-cylinder engine 2 and the frame 1 and a rear coupling position of the V-type twin-cylinder engine 2 and the frame 1, and a junction of the second exhaust pipe 32 and the muffler 4 is located in an area between a rear wheel center of the all-terrain vehicle and the rear coupling position of the V-type twin-cylinder engine 2 and the frame 1. It is found by experiments that, when the junction of the first exhaust pipe 31 and the second exhaust pipe 32 and the junction of the second exhaust pipe 32 and the muffler 4 are located in the above-described areas, the exhaust assembly has low leakage probability and high reliability.

Figure 4:
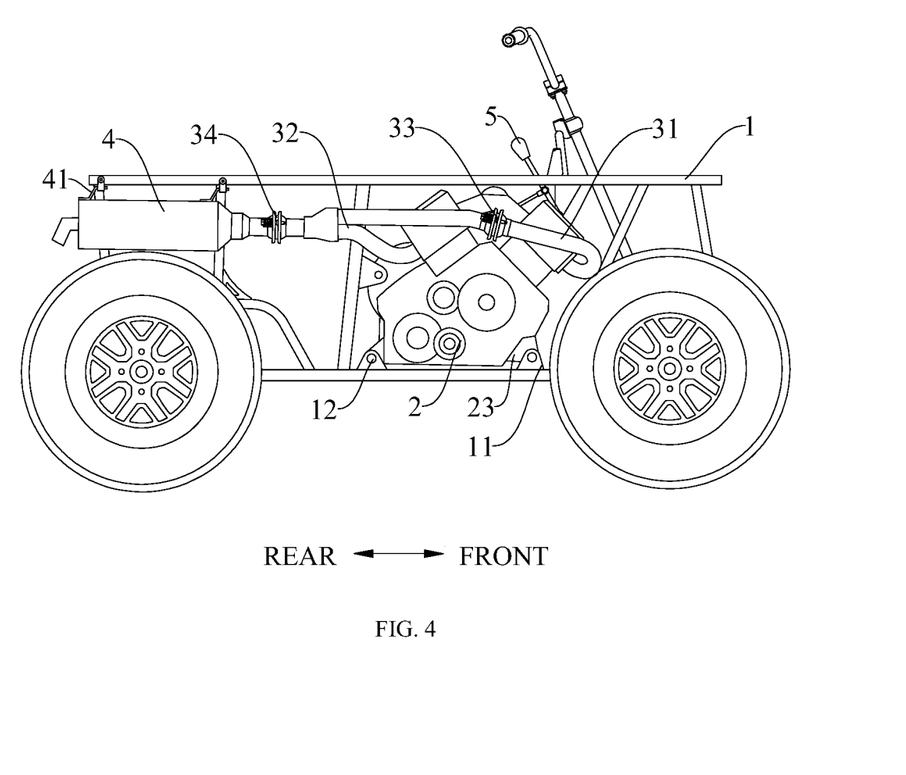
FIG. 4 is a schematic view of an all-terrain vehicle according to yet another embodiment of the present disclosure.

In some embodiments, as illustrated in FIGS. 1, 3 and 4, the V-type twin-cylinder engine 2 is flexibly coupled to the frame 1, and the muffler 4 is flexibly coupled to the frame 1. For example, the frame 1 is provided with a support 11, the support 11 defines a mounting hole 112, the V-type twin-cylinder engine 2 has a coupling lug 23, the coupling lug 23 defines a coupling hole 232, a pin shaft 12 passes through the mounting hole 112 of the support 11 and the coupling hole 232 of the coupling lug 23, to couple the support 11 to the coupling lug 23. The muffler 4 and the frame 1 are coupled by a metal elastic sheet 41. Thus, in the travel process of the all-terrain vehicle, the junctions between the V-type twin-cylinder engine 2, the frame 1 and the exhaust assembly are not easy to loose and have high reliability.

In some embodiments, as illustrated in FIG. 3, an angle α between an axis of the cylinder corresponding to the first exhaust port 21 and an axis of the cylinder corresponding to the second exhaust port 22 satisfies: $60°≤α≤120°$. It is found through researches that, by limiting the angle within the afore-mentioned range, the stability of the V-type twin-cylinder engine 2 can be improved, and the balancing effect of the V-type twin-cylinder engine 2 can be good.

In at least one embodiment, the angle α satisfies: $70°≤α≤95°$. For example, when the angle α is 70° or 95°, it is found through researches that, the operation of the V-type twin-cylinder engine 2 is more stable, and the balancing effect of the V-type twin-cylinder engine 2 is better.

Figure 5:
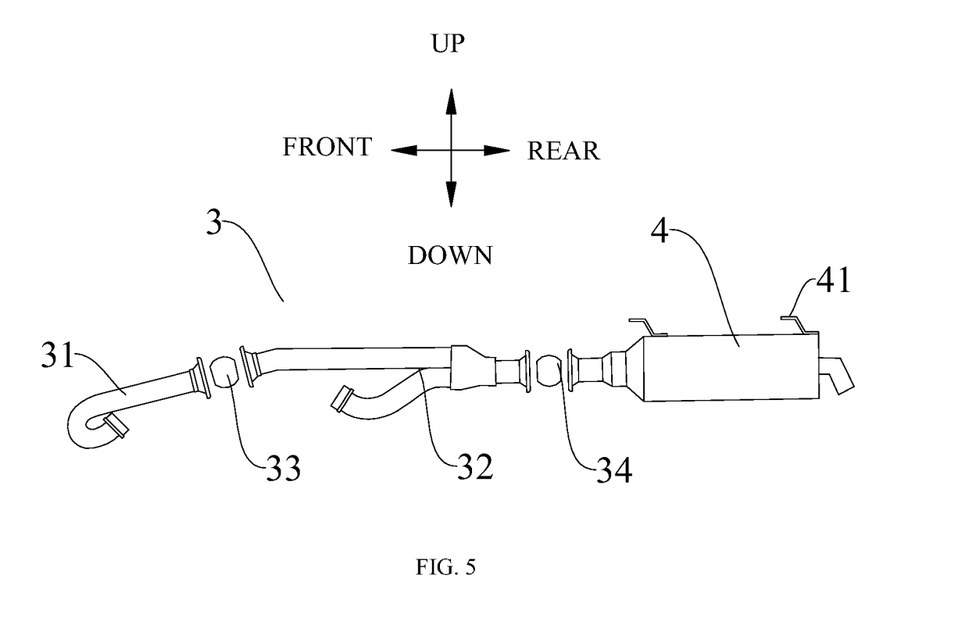
FIG. 5 is a schematic view of an exhaust assembly for an all-terrain vehicle according to an embodiment of the present disclosure.

As illustrated in FIG. 5, an exhaust assembly for an all-terrain vehicle according to another embodiment of the present disclosure includes an exhaust pipe group 3 and a muffler 4. The exhaust pipe group 3 is coupled to a pipe of the muffler 4, the exhaust pipe group 3 is divided into at least two exhaust pipes, and adjacent exhaust pipes are flexibly coupled.

In some embodiments, the exhaust pipe group 3 includes a first exhaust pipe 31 and a second exhaust pipe 32. The first exhaust pipe 31 and the second exhaust pipe 32 are flexibly coupled through a first sealing sleeve 33, and the second exhaust pipe 32 and the muffler 4 are flexibly coupled through a second sealing sleeve 34. The second exhaust pipe 32 has three ports, the second exhaust pipe 32 has a substantially Y shape, and the three ports are located in ends of second exhaust pipe 32, respectively. A first port of the first exhaust pipe 31 is coupled to the first exhaust port 21, a second port of the first exhaust pipe 31 is flexibly coupled to the first port of the second exhaust pipe 32, a second port of the second exhaust pipe 32 is coupled to the second exhaust port 22, and a third port of the second exhaust pipe 32 is flexibly coupled to the muffler 4.

Further, the second port of the first exhaust pipe 31 is flexibly coupled to the first port of the second exhaust pipe 32 through the first sealing sleeve 33, and the third port of the second exhaust pipe 32 is flexibly coupled to the muffler 4 through the second sealing sleeve 34. For example, the first sealing sleeve 33 and the second sealing sleeve 34 are spherical sealing sleeves or cylindrical sealing sleeves. In at least one embodiment, the first sealing sleeve 33 is a spherical sealing sleeve or a cylindrical sealing sleeve, and the second sealing sleeve 34 is a spherical sealing sleeve. Thus, in the exhaust assembly according to embodiments of the present disclosure, the junctions of the exhaust assembly can be sealed by the spherical sealing sleeve or the cylindrical sealing sleeve, to further improve sealing performance of the exhaust assembly.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," "counterclockwise," "axial," "radial" and "circumferential" should be construed to refer to the orientation as then described or as shown in the drawings under discussion. These relative terms are for convenience of description and do not require that the present disclosure be constructed or operated in a particular orientation.

In addition, terms such as "first" and "second" are used herein for purposes of description and are not intended to indicate or imply relative importance or significance or to imply the number of indicated technical features. Thus, the feature defined with "first" and "second" may comprise at least one this feature. In the description of the present disclosure, "a plurality of" means at least two, for example, two, three, etc., unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present application, unless specified or limited otherwise, a structure in which a first feature is "on" or "below" a second feature may include an embodiment in which the first feature is in direct contact with the second feature, and may also include an embodiment in which the first feature and the second feature are in indirect contact with each other via an intermediate medium. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

In the present disclosure, reference to term such as "an embodiment," "some embodiments," "an example," "a specific example," or "some examples," means that a particular feature, structure, material, or characteristic described in connection with the embodiment or example is included in at least one embodiment or example of the present disclosure. Schematic representations of the above terms throughout this specification are not necessarily referring to the same embodiment or example. Furthermore, the particular features, structures, materials, or characteristics may be combined in any suitable manner in one or more embodiments or examples. In addition, under the condition of not contradicting each other, those skilled in the art can incorporate and combine different embodiments or examples and features of different embodiments or examples described in this specification.

Although explanatory embodiments have been shown and described, it would be appreciated by those skilled in the art that the above embodiments cannot be construed to limit the present disclosure, and changes, alternatives, and modifications can be made in the embodiments within the scope of the present disclosure.

What is claimed is:

1. An all-terrain vehicle, comprising: a frame; a V-type twin-cylinder engine having a first exhaust port and a second exhaust port, a cylinder corresponding to the first exhaust port being located in front of a cylinder corresponding to the second exhaust port, the V-type twin-cylinder engine being mounted on the frame; and an exhaust assembly comprising an exhaust pipe group and a muffler, the muffler being mounted on the frame, the exhaust pipe group having a first end coupled to the first exhaust port, a second end coupled to the second exhaust port, and a third end coupled to a pipe of the muffler, the exhaust pipe group being divided into at least two exhaust pipes, adjacent exhaust pipes being flexibly coupled, wherein the exhaust pipe group comprises a first exhaust pipe and a second exhaust pipe, the second exhaust pipe has three ports, a first port of the first exhaust pipe is coupled to the first exhaust port, a second port of the first exhaust pipe is flexibly coupled to a first port of the second exhaust pipe, a second port of the second exhaust pipe is coupled to the second exhaust port, a third port of the second exhaust pipe is flexibly coupled to the pipe of the muffler, wherein the second port of the first exhaust pipe is flexibly coupled to the first port of the second exhaust pipe through a first sealing sleeve, and the third port of the second exhaust pipe is flexibly coupled to the pipe of the muffler through a second sealing sleeve, and wherein the second exhaust pipe has a Y shape.

2. The all-terrain vehicle according to claim 1, wherein the exhaust pipe group is flexibly coupled to the muffler.

3. The all-terrain vehicle according to claim 1, wherein the first sealing sleeve and the second sealing sleeve are spherical sealing sleeves or cylindrical sealing sleeves.

4. The all-terrain vehicle according to claim 1, wherein the first sealing sleeve is a spherical sealing sleeve or a cylindrical sealing sleeve, and the second sealing sleeve is a spherical sealing sleeve.

5. The all-terrain vehicle according to claim 1, further comprising a gearshift assembly coupled to the V-type twin-cylinder engine, wherein the gearshift assembly and the exhaust pipe group are respectively arranged at two sides of the V-type twin-cylinder engine in a width direction of the frame.

6. The all-terrain vehicle according to claim 5, wherein the gearshift assembly comprises a shift handle and a shift rod, the shift handle is coupled to the shift rod, and the shift rod is coupled to the V-type twin-cylinder engine.

7. The all-terrain vehicle according to claim 1, wherein the muffler is mounted on a rear portion of the frame, and an axial direction of the muffler is substantially parallel or orthogonal to a length direction of the frame.

8. The all-terrain vehicle according to claim 1, wherein in a projection of the all-terrain vehicle on a horizontal plane, a junction of the first exhaust pipe and the second exhaust pipe is located in an area between a front coupling position of the V-type twin-cylinder engine and the frame and a rear coupling position of the V-type twin-cylinder engine and the frame, and a junction of the second exhaust pipe and the muffler is located in an area between a rear wheel center of the all-terrain vehicle and the rear coupling position of the V-type twin-cylinder engine and the frame.

9. The all-terrain vehicle according to claim 1, wherein an angle $\alpha$ between an axis of the cylinder corresponding to the first exhaust port and an axis of the cylinder corresponding to the second exhaust port satisfies: $60°\leq\alpha\leq120°$.

10. The all-terrain vehicle according to claim 9, wherein the angle $\alpha$ satisfies: $70°\leq\alpha\leq95°$.

11. The all-terrain vehicle according to claim 1, wherein the V-type twin-cylinder engine is flexibly coupled to the frame, and the muffler is flexibly coupled to the frame.

12. The all-terrain vehicle according to claim 11, wherein the frame is provided with a support, the support defines a mounting hole, the V-type twin-cylinder engine has a coupling lug, the coupling lug defines a coupling hole, a pin shaft passes through the mounting hole of the support and the coupling hole of the coupling lug, to couple the support to the coupling lug.

13. The all-terrain vehicle according to claim 11, wherein the muffler and the frame are coupled by a metal elastic sheet.

14. An all-terrain vehicle, comprising:
a frame;
a V-type twin-cylinder engine having a first exhaust port and a second exhaust port, a cylinder corresponding to the first exhaust port being located in front of a cylinder corresponding to the second exhaust port, the V-type twin-cylinder engine being mounted on the frame; and
an exhaust assembly comprising an exhaust pipe group and a muffler, the muffler being mounted on the frame, the exhaust pipe group has a first end coupled to the first exhaust port, a second end coupled to the second exhaust port, and a third end coupled to a pipe of the muffler, the exhaust pipe group being divided into at least two exhaust pipes, adjacent exhaust pipes being flexibly coupled,
wherein in a projection of the all-terrain vehicle on a horizontal plane, a junction of the first exhaust pipe and the second exhaust pipe is located in an area between a front coupling position of the V-type twin-cylinder engine and the frame and a rear coupling position of the V-type twin-cylinder engine and the frame, and a junction of the second exhaust pipe and the muffler is located in an area between a rear wheel center of the all-terrain vehicle and the rear coupling position of the V-type twin-cylinder engine and the frame.

15. The all-terrain vehicle according to claim 14, wherein the exhaust pipe group is flexibly coupled to the muffler.

16. The all-terrain vehicle according to claim 14, wherein the second port of the first exhaust pipe is flexibly coupled to the first port of the second exhaust pipe through a first sealing sleeve, and the third port of the second exhaust pipe is flexibly coupled to the pipe of the muffler through a second sealing sleeve.

17. The all-terrain vehicle according to claim 16, wherein the first sealing sleeve and the second sealing sleeve are spherical sealing sleeves or cylindrical sealing sleeves.

18. An exhaust assembly for an all-terrain vehicle, comprising: a muffler, and an exhaust pipe group coupled to the muffler, the exhaust pipe group being divided into at least two exhaust pipes, adjacent exhaust pipes being flexibly coupled, wherein the exhaust pipe group comprises a first exhaust pipe and a second exhaust pipe, the second exhaust pipe has three ports, a first port of the first exhaust pipe is configured to be coupled to a first exhaust port of a V-type twin-cylinder engine of the all-terrain vehicle, a second port of the first exhaust pipe is flexibly coupled to a first port of the second exhaust pipe, a second port of the second exhaust pipe is configured to be coupled to a second exhaust port of the V-type twin-cylinder engine of the all-terrain vehicle, a third port of the second exhaust pipe is flexibly coupled to a pipe of the muffler, wherein the second port of the first exhaust pipe is flexibly coupled to the first port of the second exhaust pipe through a first sealing sleeve, and the third port of the second exhaust pipe is flexibly coupled to the pipe of the muffler through a second sealing sleeve, and wherein an angle $\alpha$ between an axis of the cylinder corresponding to the first exhaust port and an axis of the cylinder corresponding to the second exhaust port satisfies: $70° \leq \alpha \leq 95°$.

* * * * *